United States Patent [19]
Schafer et al.

[11] 3,761,490
[45] Sept. 25, 1973

[54] CYCLOPROPANE-CARBOXYLIC ACID BENZOTHIAZYLAMIDES

[75] Inventors: Werner Schafer, Leverkusen; Klaus Sasse, Schildgen; Ludwig Eue; Helmuth Hack, both of Cologne, all of Germany

[73] Assignee: Bayer Aktiengesellschaft, Leverkusen, Germany

[22] Filed: Oct. 15, 1970

[21] Appl. No.: 81,117

[30] Foreign Application Priority Data
Oct. 23, 1969 Germany.................. P 19 53 357.4

[52] U.S. Cl.................................. 260/305, 71/90
[51] Int. Cl............................................ C07d 91/46
[58] Field of Search..................................... 260/305

[56] References Cited
UNITED STATES PATENTS
3,306,727   2/1967   Neighbors....................... 260/306.8
FOREIGN PATENTS OR APPLICATIONS
1,211,856   3/1966   Germany........................... 260/305

Primary Examiner—Richard J. Gallagher
Attorney—Burgess, Dinklage & Sprung

[57] ABSTRACT

Cyclopropane-carboxylic acid benzothiazylamides of the formula

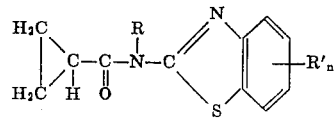

wherein
R is hydrogen or alkyl of from one to four carbon atoms;
R' is halogen, alkyl or from one to four carbon atoms and/or alkoxy of from one to two carbon atoms; and
n is 0, 1 or 2 exhibit exceptional herbicidal activity including selective herbicidal activity.

15 Claims, No Drawings

CYCLOPROPANE-CARBOXYLIC ACID BENZOTHIAZYLAMIDES

The present invention relates to certain new cyclo-propane-carboxylic acid benzothiazylamides, to compositions containing them, and to their use, a herbicides.

It is known that acyl-2-aminobenzothiozoles-1,3 have herbicidal activity from German Patent Specification No. 1,211,856. It is also known that cyclopropanecarboxylic acid anilidines, for example, particularly N-(2-thiazyl)-cyclopropane-carboxamide, possess herbicidal activity from U. S. Pat. Specification No. 3,306,727.

The invention provides cyclopropanecarboxylic acid benzothiazylamides of the formula:

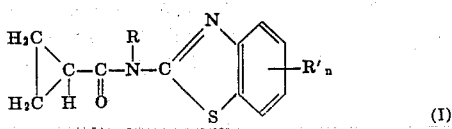

in which
R is hydrogen or alkyl of from one to four carbon atoms,
R' is halogen, preferably chlorine or bromine, alkyl of from one to four carbon atoms and/or alkoxy of from one to two carbon atoms; and
n is 0, 1 or 2.

These compounds exhibit strong herbicidal properties. Surprisingly, the cyclopropanecarboxylic acid benzothiazylamides according to the invention show a considerably higher herbicidal activity than the cyclopropanecarboxylic acid thiazylamide or propionic acid benzothiazylamide known in the prior art, which are chemically closest compounds having the same type of bio-activity. The substances according to the invention therefore represent an enrichment of the art.

The invention also provides a process for the production of a cyclopropanecarboxylic acid benzothiazylamide of the formula (I) in which cyclopropanecarboxylic acid chloride of the formula:

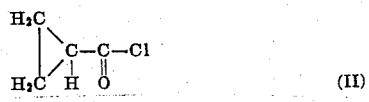

is reacted with a 2-aminobenzothiazole of the formula:

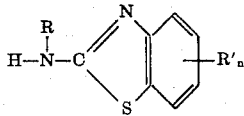

in which
R, R' and n have the meaning stated above in the presence of an acid-binder and a solvent.

If cyclopropanecarboxylic acid chloride and 2-amino-benzothiazole are used as starting materials, the reaction course can be represented by the following formula scheme:

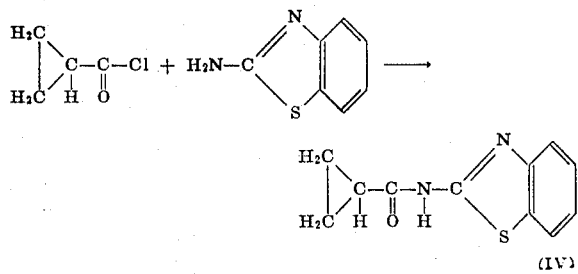

As examples of the 2-amino-benzothiazoles-1,3 used as starting materials, the following are mentioned in particular:
a-amino-benzothiazole-1,3
2-methylamino-benzothiazole-1,3
2-ethylamino-benzothiazole-1,3
2-n-propylamino-benzothiazole-1,3
2-sec.-butylamino-benzothiazole-1,3
2-amino-4-methyl-benzothiazole-1,3
2-amino-6-methyl-benzothiazole-1,3
2-amino-4-ethyl-benzothiazole-1,3
2-amino-6-isopropyl-benzothiazole-1,3
2-amino-5-chloro-6-methyl-benzothiazole-1,3
2-amino-5,6-dichloro-benzothiazole-1,3
2-amino-6-chloro-benzothiazole-1,3
2-amino-5-bromo-6-chloro-benzothiazole-1,3
2-amino-6-methoxy-benzothiazole-1,3

The 2-aminobenzothiazoles-1,3 used as starting materials are largely known; the still new representatives may be prepared according to the same processes. Thus, 2-alkyl-aminobenzothiazoles can be prepared by reaction of 2-chlorobenzothiazole with primary aliphatic amines. The known cyclopropanecarboxylic acid chloride is obtained for example from cyclopropanecarboxylic acid by reaction with thionyl chloride or phosphorus pentachloride.

As diluent in the reaction of 2-aminobenzothiazoles with cyclopropanecarboxylic acid chloride, all inert organic solvents are suitable. These include preferably hydrocarbons such as benzine, benzene, toluene, xylene; halogenated hydrocarbons such as carbon tetrachloride, chloroform; or ethers, such as diethyl ether or dioxane. As acid-binders, all customary acid-binding agents, such as alklai metal hydroxides (for example sodium hydroxide), alkali metal carbonates (for example potassium carbonate) organic bases (for example pyridine or triethylamine) can be used.

The reaction temperatures can be varied within a fairly wide range. They are, in general, from $-10°$ to $200°C.$, preferably $0°$ to $110°C$.

When carrying out the process according to the invention, one mole of acid-binder and 1 mole of cyclopropanecarboxylic acid chloride are generally used per mole of 2-aminobenzo-thiazole. In general, the reaction is begun at low temperatures, and heating to higher temperatures is then effected slowly. Working up may take place in customary manner, for example by evaporation of the solvent, filtration, extraction and recrystallization.

The active compounds exhibit a strong herbicidal potency and can therefore be used as weed killers on the land and in the water. By weeds in the widest sense are meant all plants which grow in places where they are not desired. Whether the active compounds according to the invention act as total or selective herbicidal agents depends on the magnitude of the amount of active compound applied.

The active compounds according to the invention can be used for example in the case of the following plants: dicotyledons, such as mustard (Sinapis), cress (Lepidium), cleaver (Galium), common chickweed (Stellaria), mayweed Matricaria), smallflower Galinsoga (Galinsoga), fathen (Chenopodium), stinging nettles (Urtica), groundsel (Senecio), cotton (Gossypium), beets (Beta), carrots (Daucus), beans (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum).

The active compounds are used preferably as selective herbicides. They exhibit, e.g., a good selectivity in maize, cereals, cotton, potatoes, peas, beans and flax as well as in other cultivations.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chlak, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The active compounds according to the invention may be present in the formulations in admixture with other active compounds.

The formulations contain, in general, from 0.1 to 95, preferably 0.5 to 90, per cent by weight of active compound.

The active compounds may be applied as such or in the form of their formulations or of the application forms prepared therefrom, such as ready-to-use solutions, emulsions, suspensions, powders, pastes and granulates. Application may take place in the usual manner, for example by dusting, spraying, watering or scattering.

The active compounds can be used either before emergence or after emergence of the plants.

The amount applied may vary within fairly wide ranges. It depends essentially on the nature of the desired effect. In general, the amounts applied are from 0.1 to 20 kg of active compound per hectare, preferably 0.5 to 15 kg per hectare.

The invention therefore provides a herbicidal composition containing as active ingredient a compound according to the invention in admixture with a solid diluent or carrier or in admixture with a liquid diluent or carrier, containing a surface-active agent.

The invention also provides a method of combating weeds which comprises applying to the weeds or a weed habitat a compound according to the invention alone or in the form of a composition containing as active ingredient a compound according to the invention in admixture with a solid or liquid diluent or carrier The invention is illustrated by the following Examples. The following compounds, illustrative of this invention, were used as test compounds and/or illustrate the mode of preparation of the inventive compounds in the examples, below:

Compound 1 Cyclopropanecarboxylic acid benzothiazyl-1,3-amide.
Compound 2 Cyclopropanecarboxylic acid N-methylbenzo-thiazyl-1,3-amide.
Compound 3 Cyclopropanecarboxylic acid N-ethylbenzo thiazyl-1,3-amide.
Compound 4 Cyclopropanecarboxylic acid N-n-propylbenzothiazyl-1,3-amide.
Compound 5 Cyclopropanecarboxylic acid N-sec.-butyl-benzothiazyl-1,3-amide.
Compound 6 Cyclopropanecarboxylic acid 5-methyl benzothiazyl-1,3-amide.
Compound 7 Cyclopropanecarboxylic acid 5-ethyl benzothiazyl-1,3-amide.
Compound 8 Cyclopropanecarboxylic acid 6-isopropyl benzothiazyl-1,3-amide.
Compound 9 Cyclopropanecarboxylic acid 5-chloro benzothiazyl-1,3-amide.
Compound 10 Cyclopropanecarboxylic acid 4,6-dichloro benzothiazyl-1,3-amide.
Compound 11 Cyclopropanecarboxylic acid 4-methyl-4-bromo benzothiazyl-1,3amide.
Compound 12 Cyclopropanecarboxylic acid 6-methoxy benzothiazyl-1,3-amide.
Compound 13 Cyclopropanecarboxylic acid 4-methyl-6-bromo benzothiazyl-1,3-amide
Compound 14 Cyclopropanecarboxylic acid 5,6-dichloro benzothiazyl-1,3-amide.
Compound 15 Cyclopropanecarboxylic acid 6-chloro benzothiazyl-1,3-amide.
Compound 16 Cyclopropanecarboxylic acid 5-bromo-6-chlorobenzothiazyl-1,3-amide.

EXAMPLE A

Pre-emergence test
 Solvent: five parts by weight acetone
 Emulsifier: one part by weight alkylaryl polyglycol ether To produce a suitable preparation of active compound, one part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the compound in the preparation was of no importance, only the amount of active compound applied per unit area being decisive. After three weeks, the degree of damage to the test plants was determined and characterized by the values 0–5, which have the following meaning.

0 no effect
1 slight damage or delay in growth
2 marked damage or inhibition of growth
3 heavy damage and only deficient development, or only 50 percent emergency 4 plants partially destroyed after germination or only 25 percent emerged.

5 plants completely dead or not emerged.

The active compounds, the amounts applied and the results obtained can be seen from Table A.

sprayed with the preparation of the active compound such a way, that the amount of active compound per unit area as given in the following table, is used. Depending on the concentration of the spraying liquor, the amount of water ranges from 1000 – 2000 l/ha.

TABLE A.—PRE-EMERGENCE TEST

| Active compound | Amount of active compound applied kg./hectare | Sinapis | Echino-chloa | Selaria | Lolium | Galin-soga | Matri-caria | Oats | Cotton | Wheat | Corn |
|---|---|---|---|---|---|---|---|---|---|---|---|
| [structure] (known) | 20 | 4 | 2 | 5 | 3 | 4-5 | 4-5 | 4 | 3 | 3 | 2 |
|  | 10 | 4 | 2 | 4 | 3 | 4-5 | 4-5 | 4 | 2 | 2 | 2 |
|  | 5 | 3 | 0 | 4 | 1 | 4 | 4 | 2 | 2 | 1 | 1 |
|  | 2.5 | 2 | 0 | 3 | 1 | 3 | 3 | 0 | 0 | 0 | 1 |
| [structure] (Compound 1) | 20 | 5 | 5 | 5 | 5 | 5 | 5 | 3-4 | 2 | 2 | 1 |
|  | 10 | 5 | 5 | 5 | 5 | 5 | 5 | 2 | 1 | 1 | 0 |
|  | 5 | 5 | 5 | 4-5 | 4-5 | 5 | 5 | 1 | 0 | 0 | 0 |
|  | 2.5 | 4 | 3-4 | 4 | 4 | 4 | 5 | 0 | 0 | 0 | 0 |
| [structure] (Compound 2) | 20 | 4-5 | 2-3 | 4-5 | 3-4 | 5 | 4-5 | 1 | 2 | 0 | 0 |
|  | 10 | 4 | 2 | 4 | 3 | 4-5 | 4 | 0 | 0 | 0 | 0 |
|  | 5 | 2 | 1 | 3-4 | 2 | 4 | 4 | 0 | 0 | 0 | 0 |
|  | 2.5 | 1 | 0 | 1 | 0 | 3 | 3 | 0 | 0 | 0 | 0 |

EXAMPLE B

Post-emergence test

Solvent : 5 parts by weight acetone

Emulsifier : 1 part by weight alkylaryl polyglycol ather

To produce a suitable preparation of active compound, 1 part by weight of active compound is mixed with the stated amount of solvent, the stated amount of emulsifier is added and the concentrate is then diluted with water to the desired concentration.

Test plants which have a height of about 5-15 cm are

After three weeks, the degree of damage to the plants is determined and characterised by the values 0 – 5, which have the following meaning:

0 no effect
1 a few slightly burnt spots
2 marked damage to leaves
3 some leaves and parts of stalks partially dead
4 plant partially destroyed
5 plant completely dead.

The active compounds, their concentrations and results obtained can be seen from Table B.

TABLE B.—POST-EMERGENCE TEST

| Active compound | Amount of active compound applied kg./hectare | Echino-chloa | Cheno-podium | Sina-pis | Galin-soga | Stel-laria | Urtica | Matri-caria | Dau-cus | Oats | Cot-ton | Wheat |
|---|---|---|---|---|---|---|---|---|---|---|---|---|
| [structure] (known) | 4 | 3 | 4-5 | 5 | 3 | 2 | 5 | 2 | 2 | 3 | 3-4 | 3 |
|  | 2 | 1 | 2 | 4-5 | 2 | 0 | 5 | 0 | 2 | 1 | 2 | 1 |
|  | 1 | 0 | 1 | 3 | 0 | 0 | 2 | 0 | 1 | 0 | 1 | 0 |
| [structure] (Compound 1) | 4 | 5 | 5 | 5 | 5 | 5 | 5 | 4 | 5 | 5 | 2 | 4 |
|  | 2 | 5 | 4 | 5 | 5 | 5 | 5 | 3 | 5 | 4 | 1 | 2 |
|  | 1 | 4-5 | 3 | 5 | 4 | 4 | 5 | 2 | 3-4 | 2-3 | 0 | 1 |
|  | 0.5 | 4 | 2 | 5 | 3 | 2-3 | 5 | 2 | 2 | 1 | 0 | 0 |
| [structure] (Compound 2) | 4 | 3-4 | 4-5 | 5 | 4 | 3-4 | 5 | 3 | 3 | 4 | 0 | 3 |
|  | 2 | 3 | 2 | 5 | 3 | 3 | 5 | 2 | 2-3 | 3 | 0 | 2 |
|  | 1 | 2 | 1 | 4-5 | 2 | 1 | 4 | 0 | 2 | 3 | 0 | 1 |
|  | 0.5 | 1 | 0 | 3 | 0 | 0 | 4 | 0 | 1 | 1 | 0 | 0 |

Example 1 - Preparation of Compound 1

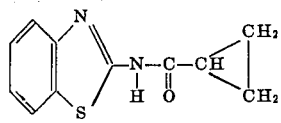

600 grams 2-aminobenzothiazole were dissolved in 3 liters of toluene, and 556 ml triethylamine were added. To this there were added dropwise in one hour, with stirring and cooling to 0°C.-5°C. with ice, 418 grams cyclopropanecarboxylic acid chloride. Heating to 100°C. was then effected slowly on a water-bath and this temperature was maintained for one hour. After standing for 10 hours at room temperature, filtration was effected. The residue on the filter was spread out on a sheet of metal in order to remove residuel toluene. The residue was suspended in water, in order to remove triethylamine hydrochloride. The salt-free residue was dried at 50°C/14 mm and then recrystallized from toluene; yield 748 grams, cream-colored crystals of m.p. 220°-222°C.

Example 2 - Preparation of Compound 2

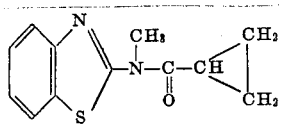

33 grams 2-methylaminobenzothiazole were dissolved in 150 ml toluene, and 28 ml triethylamine were added. To this there were added dropwise within 5 minutes, with stirring and cooling to 10°C., 21 grams cyclopropanecarboxylic acid chloride. Heating to 100°C. was then effected for three hours. The red-brown solution formed was subsequently cooled to about 10°C and the substance which had crystallized out was filtered off. The residue was freed from toluene in the air, then suspended in water in order to remove triethylamine hydrochloride. The filtered, salt-free residue was dried in a vacuum at 50°C/14 mm and then recrystallized from white spirit. Yield 29 grams, colorless crystals of m.p. 120°-123°C.

The 2-methylaminobenzothiazole used as starting product was prepared as follows:

594 grams 2-chlorobenzothiazole in 700 cc dioxane were added dropwise at 0°-5°C, in one hour, with stirring, to 700 grams of aqueous methylamine solution (35 percent-strength). The mixture was left to stand at room temperature for 12 hours; heating to 100°C. was then effected for four hours, with stirring, and water and dioxane were evaporated off in a vacuum. The residue was suspended in one liter of water, the insoluble residue was filtered off and washed salt-free with water. The residue was dried at 50°C. in a vacuum drying cabinet and then recrystallized from white spirit. Yield: 391 grams of white crystals of m.p. 138°-140°C.

EXAMPLES 3-12

In manner analogous to that of Examples 1 and 2, the following compounds were prepared:

| Example number and preparation of— | Structural formula | M.P. (° C.) |
|---|---|---|
| Compound 3... | | 90-93 |
| Compound 4... | | 97-99 |
| Compound 5... | | (¹) |
| Compound 6... | | 133-135 |
| Compound 7... | | 140-142 |
| Compound 8... | | 159-162 |
| Compound 9... | | (¹) |
| Compound 10... | | 246-148 |
| Compound 11... | | 176-178 |
| Compound 12... | | 206-207 |

The starting product for Compound 8 2-ethylaminobenzothiazole-1,3 was prepared as follows:

100 ml of 50 percent-strength aqueous ethylamine were dissolved in 100 ml dioxane, and to this there were added drop-wise in 10 minutes, at 0°-5°C., 85 grams 2-chlorobenzothiazole (0.5 mole) in 100 cc dioxane. Stirring was effected for one hour at room temperature, followed by heating to 100°C. for two hours. The clear solution was then evaporated in a vacuum; the crystalline residue was suspended in water, and filtered. The salt-free residue remaining behind was dried at 50°C. in a vacuum and then recrystallized from white spirit. Yield: 61 grams of white crystals, m.p. 87°–90°C.

The starting product for Compound 8, 2-amino-6-isopropyl-benzothiazole-1,3 was prepared as follows:

135 grams 4-isopropylaniline were added dropwise in 15 minutes, at room temperature, with stirring, to 1250 grams acetic acid, a dark-red solution forming. Into this solution were introduced, with stirring, 324 grams (4 equ.) of sodium thiocyanate. 50 ml. bromine were now added dropwise within 30 minutes, at 25°–30°C., with vigorous stirring. Heating to 50°–55°C was then effected for 20 minutes. After cooling to 20°C., adjustment to pH 8 was effected by addition of 25 percent strength ammonia solution, with stirring. After standing for 24 hours at room temperature, the supernatant solution was poured off. The residue remaining behind was recrystallized from xylene. Yield: 104 grams of yellow crystals, m.p.: 123°–126°C.

EXAMPLES 13–16

In manner analogous to that of Examples 1 and 2, the following compounds were prepared

| Example number and preparation of— | Structural formula | M.P. (° C.) |
|---|---|---|
| Compound 13 | (structure with Br, CH₃, benzothiazole, N-C(O)-CH, CH₂, CH₂) | 176–178 |
| Compound 14 | (structure with Cl, Cl, benzothiazole, N-C(O)-CH, CH₂, CH₂) | 241–243 |
| Compound 15 | (structure with Cl, benzothiazole, N-C(O)-CH, CH₂, CH₂) | 240–242 |
| Compound 16 | (structure with Br, Cl, benzothiazole, N-C(O)-CH, CH₂, CH₂) | 236–238 |

It will be appreciated that the instant specification and examples are set forth by way of illustration and not limitative, and that various modifications and changes may be made without departing from the spirit and scope of the present invention.

What is claimed is:

1. A cyclopropanecarboxylic acid benzothiazylamide compound of the formula $$\begin{array}{c} H_2C \\ \phantom{H_2C} \diagdown \\ \phantom{H_2C} \phantom{\diagdown} C-C-N-C \\ \phantom{H_2C} \diagup \phantom{C} | \phantom{C} \diagdown \\ H_2C \phantom{\diagup} H \phantom{C} O \end{array} \text{(benzothiazole)} - R'_n$$

wherein

R is hydrogen or alkyl of from one to four carbon atoms;

R' is selected from the group consisting of halogen, alkyl of from one to four carbon atoms and alkoxy of from one to two carbon atoms; and n is 1 or 2, or, when R is alkyl, may be 0, and wherein, when n is 2, the R' 's may be the same or different.

2. Compound as claimed in claim 1 wherein R' is chlorine or bromine.

3. Compound as claimed in claim 1 wherein R is hydrogen.

4. Compound as claimed in claim 1 wherein n is 1.

5. Compound as claimed in claim 1 designated as cyclopropanecarboxylic acid N-methylbenzothiazyl-1,3-amide.

6. Compound as claimed in claim 1 designated as cyclopropanecarboxylic acid N-ethyl benzothiazyl-1,3-amide.

7. Compound as claimed in claim 1 designated as cyclopropanecarboxylic acid N-n-propylbenzothiazyl-1,3-amide.

8. Compound as claimed in claim 1 designated as cyclopropanecarboxylic acid N-sec.-butyl-benzothiazyl-1,3-amide.

9. Compound as claimed in claim 1 designated as cyclopropanecarboxylic acid 5-methyl benzothiazyl-1,3-amide.

10. Compound as claimed in claim 1 designated as cyclopropanecarboxylic acid 5-ethyl benzothiazyl-1,3amide.

11. Compound as claimed in claim 1 designated as cyclopropanecarboxylic acid 6-isopropyl benzothiazyl-1,3-amide.

12. Compound as claimed in claim 1 designated as cyclopropanecarboxylic acid 5-chloro benzothiazyl-1,3-amide.

13. Compound as claimed in claim 1 designated as cyclopropanecarboxylic acid 4,6-dichloro benzothiazyl-1,3-amide.

14. Compound as claimed in claim 1 designated as cyclopropanecarboxylic acid 4-methyl-6-bromo benzothiazyl-1,3-amide.

15. Compound as claimed in claim 1 designated as cyclopropanecarboxylic acid 6-methoxy benzothiazyl-1,3-amide.

* * * * *

FO-1050
(5/69)

UNITED STATES PATENT OFFICE
CERTIFICATE OF CORRECTION

Patent No. __3,761,490__   Dated __September 25, 1973__

Inventor(s) __Werner Schafer et al__

It is certified that error appears in the above-identified patent and that said Letters Patent are hereby corrected as shown below:

Col. 1, line 5, change "a" to --as--.

Col. 8, Examples 3 - 12 - Compounds 5 and 9 (lines 14 and 37) delete "($^1$)" and insert -- brittle mass --.

Col. 10, line 22 (Claim 4), change "n is 1" to -- n is 0 --.

Signed and sealed this 14th day of May 1974.

(SEAL)
Attest:

EDWARD M. FLETCHER, JR.
Attesting Officer

C. MARSHALL DANN
Commissioner of Patents